(12) United States Patent
Colombo et al.

(10) Patent No.: US 11,104,613 B2
(45) Date of Patent: Aug. 31, 2021

(54) GEOPOLYMERIC FORMULATIONS AND ASSOCIATED METHODS FOR THE MANUFACTURING OF THREE-DIMENSIONAL STRUCTURES

(71) Applicant: ITT Italia S.r.l., Lainate (IT)

(72) Inventors: Paolo Colombo, Barge (IT); Giorgia Franchin, Barge (IT); Hamada Said Abdelwahab Elsayed, Barge (IT); Agustin Sin Xicola, Barge (IT)

(73) Assignee: ITT ITALIA S.R.L., Lainate (IT)

( * ) Notice: Subject to any disclaimer, the term of this patent is extended or adjusted under 35 U.S.C. 154(b) by 219 days.

(21) Appl. No.: 16/061,475

(22) PCT Filed: Dec. 16, 2016

(86) PCT No.: PCT/IB2016/057717
§ 371 (c)(1),
(2) Date: Jun. 12, 2018

(87) PCT Pub. No.: WO2017/103877
PCT Pub. Date: Jun. 22, 2017

(65) Prior Publication Data
US 2020/0140332 A1    May 7, 2020

(30) Foreign Application Priority Data

Dec. 18, 2015 (IT) .................. 102015000085390

(51) Int. Cl.
*C04B 28/00* (2006.01)
*C04B 28/34* (2006.01)
(Continued)

(52) U.S. Cl.
CPC ........... *C04B 28/006* (2013.01); *B28B 1/001* (2013.01); *C04B 28/34* (2013.01); *B33Y 10/00* (2014.12);
(Continued)

(58) Field of Classification Search
CPC ..... C04B 28/005; C04B 28/006; C04B 28/34; C04B 2111/00215; C04B 2111/00181
See application file for complete search history.

(56) References Cited

U.S. PATENT DOCUMENTS

2007/0144407 A1   6/2007  Biscan et al.
2014/0194328 A1*  7/2014  Alessi ............... C09K 8/80
                                                    507/269

FOREIGN PATENT DOCUMENTS

DE    102014003103    12/2014
WO    WO 2011/020975    2/2011

OTHER PUBLICATIONS

Vance et al., Rheol. Acta. (2014) 53:843-855.*
(Continued)

*Primary Examiner* — Vu A Nguyen
(74) *Attorney, Agent, or Firm* — Knobbe, Martens, Olson & Bear, LLP

(57) ABSTRACT

A geopolymeric ink formulation for direct 3D printing containing a geopolymeric formulation whose components are present in such proportions as to be subjected to a geopolymerization reaction and to provide, at the end of the reaction, a solid geopolymer and wherein the formulation, before and during at least a part of the geopolymerization reaction, wherein three-dimensional chemical bonds have not yet been formed, forms a reversible-gel, non-Newtonian, viscoelastic fluid. The formulation is extruded through a 3D printing tool equipped with nozzle into strands according to a geometry such as to create a three-dimensional structure on one or more layers. The extrusion preferably takes place within a hydrophobic liquid, such as oil.

12 Claims, 5 Drawing Sheets

(51) Int. Cl.
   *B33Y 70/00* (2020.01)
   *B28B 1/00* (2006.01)
   *B33Y 10/00* (2015.01)
   *B33Y 70/10* (2020.01)
   *C04B 111/00* (2006.01)

(52) U.S. Cl.
   CPC ..... *B33Y 70/10* (2020.01); *C04B 2111/00181* (2013.01); *C04B 2111/00215* (2013.01)

(56) References Cited

OTHER PUBLICATIONS

Lewis et al., J. Am. Ceram. So., 89 (12), 2006, 3599-3609.*
Jennifer A. Lewis et al.: "Direct Ink Writing of Three-Dimensional Ceramic Structures", Journal of the American Ceramic Society., vol. 89, No. 12, Dec. 1, 2006 (Dec. 1, 2006), US, pp. 3599-3609, XP055299812, US ISSN: 0002-7820, DOI: 10.1111/j.1551-2916. 2006.01382.x.
Andre Butscher et al: "Printability of calcium phosphate powders for three-dimensional printing of tissue engineering scaffolds", Acta Biomaterialia, Elsevier, Amsterdam, NL, vol. 8, No. 1, Aug. 31, 2011 (Aug. 31, 2011), pp. 373-385, XP028125855, ISSN: 1742-7061, [retrieved on Sep. 6, 2011], DOI: 10.1016/J.ACTBIO.2011. 08.027.
Marcello Romagnoli et al: "Rheology of geopolymer by DOE approach", Construction and Building Materials, vol. 36, Jun. 23, 2012 (Jun. 23, 2012), Netherlands, pp. 251-258, XP055299313, ISSN: 0950-0618, DOI: 10.1016/j.conbuildmat.2012.04.122.
International Search Report and Written Opinion for International application No. PCT/IB2016/057717 dated Apr. 20, 2017.
J.E. Smay, J. Cesarano, and J. a. Lewis, "Colloidal inks for directed assembly of 3-D periodic structures," Langmuir, 18 [18] 5429-5437 (2002).
T. Schlordtl, F. Keppner, N. Travitzky, and P. Greil, "Robocasting of Alumina Lattice Truss Structures," J. Ceram. Sci. Technol., 3 [2] (2012).
First Office Action of Chinese Application No. CN201680073545, dated Aug. 5, 2020 in 15 pages (translation included).

* cited by examiner

GEOPOLYMERIC FORMULATIONS AND ASSOCIATED METHODS FOR THE MANUFACTURING OF THREE-DIMENSIONAL STRUCTURES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to geopolymeric formulations and associated methods for the manufacture of three-dimensional structures, particularly in the manufacture of vehicle brake pads or brake shoes.

PRIOR ART

Geopolymers consist of a class of materials that are generally obtained as a result of the reaction of an aluminosilicate powder with an alkaline silicate solution under near-ambient temperature and humidity conditions. Laboratory synthesis of geopolymers usually calls for using metakaolin ($2Al_2O_3.SiO_2$) or calcinated kaolinite, obtained from the thermal activation of kaolinite clay. The precursor reactants for obtaining geopolymeric binders can also be found in natural sources, such as for example in pozzolanic materials like lava or coal fly ashes. Most of the present studies in the literature were conducted utilizing scrap materials such as industrial waste or rock sediment as a source of aluminosilicates.

In 1976 Davidovits suggested that a single element containing both aluminum and silicon, possibly of geologic origin, could be made to react in a polymerization process in an alkaline solution. The compounds that were created were called "geopolymers" ("Solid-Phase Synthesis of a Mineral Blockpolymer by Low Temperature Polycondensation of Alumino-Silicate Polymers: Na-poly(sialate) or Na—PS and Characteristics" Joseph DAVIDOVITS, IUPAC Symposium on Long-Term Properties of Polymers and Polymeric Materials, Stockholm 1976, Topic III). These inorganic polymers are provided with a chemical composition somewhat similar to zeolithic materials, but are normally amorphous solids, and hence are not provided with a crystalline structure while comprising a repeating unit, such as for example of the silicon-oxide (—Si—O—Si—O—), silicon-aluminate (—Si—O—Al—O—), ferro-silicate-aluminate (—Fe—O—Si—O—Al—O—), or aluminum-phosphate (—Al—O—P—O—) types.

The chemical reaction that gives rise to the geopolymers is called geopolymerization, following a process with several steps, as per the following:
1. The dissolution of the atoms of Si and Al in the material is caused by the hydroxide ions in solution;
2. The reorientation of the precursor ions in solution;
3. The reorganization into inorganic polymers through polycondensation reactions.

The inorganic polymer network is usually a highly coordinated three-dimensional aluminosilicate structure, with negative charges on the trivalent tetrahedral $Al^{(III)}$ sites, balanced by the cations of the alkaline metal.

These materials are currently used as mixtures for replacing cements as building materials and for manufacturing composite materials formed from a geopolymeric matrix wherein ordered organic fibers are dispersed and that have good mechanical and thermal insulation characteristics. Materials of such compositions are used, for example, to construct vehicle exhaust pipes, but they do not lend themselves to obtaining micro or macro ordered structures.

Also known from US2011/0217809 is an ink for manufacturing solar cells containing nanoparticles of aluminum and a siloxane inorganic polymer that replaces the sintered glass; this ink, however, must be sintered after being deposited, for example by means of laser beams, in order to obtain the desired solid component. Its application is therefore confined to the manufacturing of small electrodes.

SUMMARY OF CERTAIN FEATURES

The purpose of the present disclosure is to provide formulas and methods for manufacturing—accurately, quickly and at low cost—both micro and macro three-dimensional solid structures for various applications and in particular that are applicable to the manufacture of parts of vehicle brake pads.

This disclosure is thus related to formulations and methods for manufacturing three-dimensional solid structures as defined in the claims.

In particular, the geopolymeric formulation according to this disclosure includes at least one inorganic compound chosen from a first group consisting of: a compound containing aluminum associated with at least one compound containing silicon, a silicon-aluminate compound, a compound containing polysilicates, polysiloxane, polysilicon-aluminates or polysialates; at least one alkaline activator and water.

According to a different embodiment, the geopolymeric formulation according to the disclosure includes at least one inorganic compound chosen from a second group consisting of an inorganic oxide, preferably of a divalent or trivalent metal; and a phosphate acid.

In both of the embodiments set out above, the components of the formulation are present in such proportions as to be subjected to a geopolymerization reaction and to provide, at the end of the reaction, a solid geopolymer; and, at the same time, the formulation, before and during at least part of the geopolymerization reaction, wherein three-dimensional chemical bonds have not yet been formed, forms a reversible-gel, non-Newtonian, viscoelastic fluid.

In the fluid state, the formulations according to the present disclosure have an initial flow limit or threshold that is greater than or equal to 20 Pa; and, at a low shear rate, such as 0.1 l/s or less, the formulations according to the disclosure have a viscosity of at least an order of magnitude higher than the viscosity that the same formulations in the fluid state have at a high shear rate, such as equal to or greater than 100 l/s.

According to a first embodiment, a formulation according to the disclosure includes metakaolin, a substance that is a source of polysilicates, preferably fly ash, a soluble alkaline polysilicate and an aqueous alkaline solution; in such proportions that the formulation in the fluid state has, at a relatively low shear rate, equal to or less than 0.1 l/s, a viscosity of four orders of magnitude greater than the viscosity that the same formulation in the fluid state has at a relatively high shear rate, equal to or greater than 100 l/s.

Moreover, such formulations according to this first embodiment exhibit in the fluid state a limit or starting-flow threshold that is greater than or equal to 20 Pa and preferably equal to or slightly less than 100 Pa; a viscosity measured at a shear rate of 0.1 l/s of about $10^3$ Pa·s; and a viscosity measured at a shear rate of 30 l/s of between about 5 to 20 Pa·s.

The formulations according to the first embodiment of the disclosure have a Si:Al atomic ratio of between 1:1 and 35:1, including the extremes of this range, and preferably equal to 2:1; a $(Na_2O, K_2O)/SiO_2$ molar ratio of between 0.20 and 0.28; a $SiO_2/Al_2O_3$ molar ratio of between 3.5 and 4.5; a $H_2O/(Na_2O, K_2O)$ molar ratio of between 10 and 25; and a $(Na_2O, K_2O)/Al_2O_3$ molar ratio of between 0.80 and 1.20; including within the aforesaid intervals also the extremes of each range.

The geopolymeric formulations according to the disclosure also include at least one filler selected from a group consisting of: rubber, organic resins, alumina, silicates, glass, mineral fillers, polymeric or inorganic short fibers; and/or agents retarding the geopolymerization reaction by means of the sequestration of water, commonly used in cement formulations; and/or gelling agents which may be any substance capable of forming a reversible gel in an alkaline or acid environment.

The disclosure also relates to ink formulations for direct 3D printing including a geopolymeric formulation in the fluid state as specified above.

In particular, an ink formulation according to the disclosure can also include at least one geopolymerization reaction retarding agent, preferably selected from the group consisting of lignosulfonates, even more preferably consisting of sodium lignosulfonate, or else from the group of sugars, such as glucose or sucrose; the retarding agent being present within the formulation in an amount comprising between 0.1 and 5% of the total weight.

Moreover, an ink formulation according to the disclosure can also include at least at least one gelling agent, preferably selected from a group consisting of: polyacrylates, preferably sodium salt of polyacrylic acid; colloidal silica; stratified silicates, such as laponite, hectorite, bentonite; the gelling agent being present within the formulation in an amount between 0.1 and 20% of the total weight.

Moreover, an ink formulation according to the disclosure can also include at least one fluidifying agent, preferably selected from a group consisting of hydrosoluble polymers as polyacrylates, even more preferably consisting of polycarboxylate ether; the fluidifying agent being present within the formulation in an amount between 0.1 and 5% of the total weight.

The present disclosure finally relates to a method for manufacturing a three-dimensional solid structure, comprising the following steps:

preparing an ink formulation for direct 3D printing whose components are present in such proportions as to undergo a geopolymerization reaction and forms a reversible-gel, non-Newtonian, viscoelastic fluid;

using the material as ink for a direct 3D printing instrument that includes the extrusion of ink through a nozzle by the application of a given pressure, according to the technique known as robocasting or "direct ink writing"; alternatively, mounting a printing head provided with an extrusion syringe on a handling system with control over three or more axes;

forming the solid three-dimensional structure on a substrate mounted on a support, sequentially extruding upon the substrate strands of said ink and at the same time moving the nozzle or print head in relation to the support in such a way as to create one or more layers formed by one or more strands arranged according to predetermined geometry;

the extrusion being carried out in such a way as to subject the ink formulation to a shear rate (or shear) of between 10 and 80 l/s and preferably equal to 30 l/s.

According to an embodiment of the method of the disclosure, the extrusion step is performed by extruding the ink formulation in a hydrophobic liquid, preferably in an oil, still more preferably in sunflower oil; having prepared the substrate immersed in the hydrophobic liquid.

Finally, according to one embodiment, the composition of the ink formulation is selected in such a way as to obtain strands which once solidified are dense, having a porosity of less than 10%; according to a different embodiment, however, the composition of the ink formulation is selected in such a way as to obtain strands which once solidified are porous, exhibiting a porosity of greater than 10% and up to 90%.

The methods of the disclosure can also comprise a heating step for the ink formulation that has been extruded and solidified at a temperature in such a way as to produce crystallization of the geopolymer present within the ink, for example, heating at 1,000° C. for one hour or more.

BRIEF DESCRIPTION OF THE DRAWINGS

The present disclosure will now be described in more detail with reference to the following practical non-limiting exemplary embodiments and with reference to FIGS. 1 to 10 of the appended drawings, wherein.

DETAILED DESCRIPTION OF CERTAIN EMBODIMENTS

Figure 1:
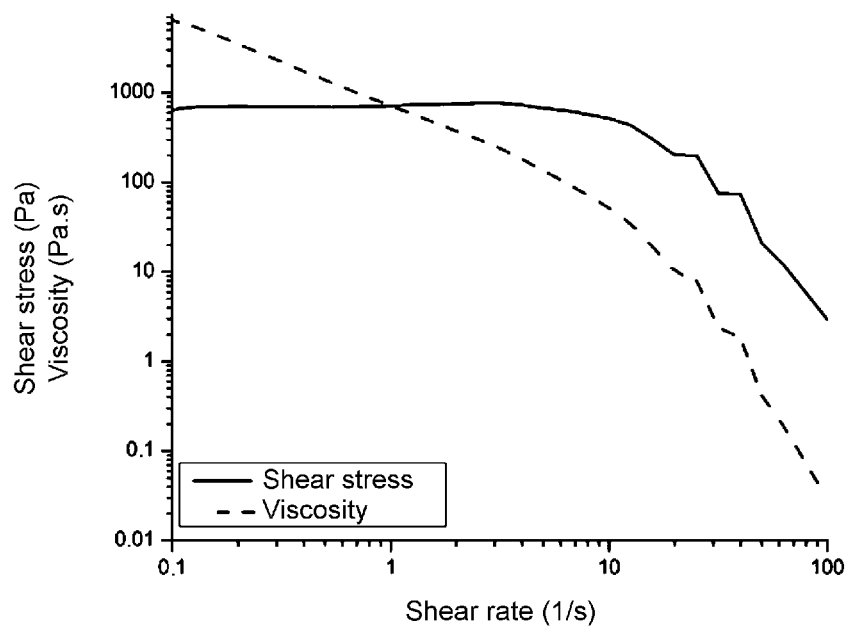
FIGS. 1, 2 and 3 are graphs illustrating the rheological behavior of a first geopolymeric formulation (in a K-MK-FA system) according to the disclosure.

The present disclosure is based on experimental evidence that geopolymeric formulations can be provided with viscoelastic properties such that they can be used to manufacture "inks" having dynamic and mechanical properties that are suitable for direct three-dimensional (3D) printing. Using such formulations, it is therefore possible to create on a substrate components that are planar geopolymers or that develop in height—of predetermined dimensions, geometry and periodicity—using direct 3D printing, which is a technique for building structures layer by layer.

The disclosure is therefore based upon the use of geopolymeric formulations and geopolymeric inks that can be extruded through capillary or non-capillary deposition nozzles in strand form and that immediately after extrusion are subjected to rapid solidification, which allows them to retain the shape imparted by the extrusion even when openings are present in the underlying layer, for which the extruded strands have spans that are not supported for at least a portion of their length.

According to the methods of the disclosure, geopolymeric inks having viscoelastic properties can be printed with a 3D printer directly in air, or else within a hydrophobic liquid medium, such as oil; immediately after extrusion, they are subjected to geopolymerization solidification with the creation of three-dimensional bonds within the geopolymer. The components/artifacts thus printed have a controlled porosity and mechanical characteristics and can therefore be adapted for use in water, for air filtration, for thermal insulation, or can be scaled for use in architecture.

3D printers that are suitable for using the formulations of the disclosure include a printing head equipped with an extrusion nozzle and a support, having control over three or more axes on the extrusion nozzle and/or on the support upon which the substrate is placed, upon which the printing takes place; for example a 3D printer can be used that is equipped on the print head with a syringe to house the geopolymer ink/composition.

The geopolymeric ink is extruded through the tip of capillary or non-capillary nozzle, tapered in the direction of extrusion, in order to form a geopolymeric strand, which is deposited onto a substrate (for example, a sheet of glass, plastic or metal). The substrate can be supported in air or immersed within a hydrophobic liquid medium such as oil. The extrusion takes place at a predetermined pressure and deposition rate. The pressure can be applied for example by using a piston, compressed air, a peristaltic pump or a screw mechanism. After having manufactured the first layer of the structure to be obtained, the nozzle is raised incrementally in the z direction (i.e., along the vertical) in order to generate the next layer. This process is repeated until the desired structure is formed.

In this way three-dimensional periodic lattices can be obtained having a simple tetragonal geometry, such as those illustrated in FIGS. 7 and 8, for example assembled from an array of parallel strands in the xy plane (i.e., in the horizontal plane) such that their orientation is orthogonal to those layers immediately above and below each layer or level. Alternatively, the vertical position of the nozzle can be progressively increased in the z direction simultaneously with the movement in the xy plane, that is, while printing progresses, in order to construct objects/three-dimensional structures having a spiral geometry. Alternatively, the coordinates X, Y, and Z can be varied more freely, for example through the use of a robotic arm as the support for the print head or of the substrate, in order to produce more complex structures and structures that are not necessarily composed of several layers.

The solidification of the geopolymer happens just after the deposition of the strand onto the substrate or onto an underlying layer that is already at ambient temperature, or else by means of heating from 50° C. to 200° C., for several hours.

The viscoelastic geopolymeric and viscoelastic geopolymeric ink formulations according to the disclosure, suitable for extrusion through a nozzle, preferably include: metakaolin, fly ashes and/or another source of poly(silicates), poly(siloxanes), poly(silico-aluminates) or poly(sialates); an alkali silicate such as soluble silicates of sodium or potassium; an aqueous alkaline solution such as potassium hydroxide solutions or sodium. The formulations according to the disclosure may also include a retarding agent, a gelling agent, and water.

Here and hereinafter, by "retarding agent" is meant a compound or mixture of compounds capable of delaying, for a predetermined period of time, the geopolymerization reaction or at least its completion with three-dimensional bonds, for example by water sequestration or other mechanisms.

Alternatively, the formulations according to the disclosure can be prepared from an inorganic oxide (preferably those of divalent or trivalent metals) and an acid phosphate; phosphate geopolymers are therefore synthesized by means of acid-base reactions.

The various components of the formulations according to the disclosure are present with concentrations that are compatible with the geopolymerization reaction; in particular, the Si:Al atomic ratio can vary from 1:1 to 35:1.

With regard to the formulations for forming geopolymers starting from metakaolin, the optimum molar ratios between the various components of the formulation are the following:
$(Na_2O, K_2O)/SiO_2=0.20-0.28$
$SiO_2/Al_2O_3=3.5-4.5$
$H_2O/(Na_2O, K_2O)=10-25$
$(Na_2O, K_2O)/Al_2O_3=0.80-1.20$ An example of the geopolymerization chemical mechanism of a formulation according to the disclosure can be the following.

A first step involves the alkalinization and the formation of tetravalent Al in the sialate side groups supplied for example by the metakaolin; then, the alkaline dissolution begins with the attachment on the part of the basic OH groups to the silicon atoms, which are thus able to extend their valence sphere to the penta-valent state. The subsequent course of the reaction can be explained by the cleavage of the oxygen in the Si—O—Si siloxane group, the formation of intermediate silanol Si—OH, on the one hand, and basic siloxo Si—O— group on the other. As the reaction progresses, the ortho-sialate molecule, which is the primary unit in geopolymerization, is isolated. The basic siloxo Si—O— reacts with the cations of the alkaline solution and forms terminals bonds.

The next step involves condensation between ortho-sialate molecules, reactive end groups and aluminum hydroxy OH—Al, with production of alkali hydroxides and the creation of cyclo-tri-sialate structures, whereby the alkali groups are liberated and react again with further polycondensation in the poly-sialate alkaline structure. In the presence of soluble alkali silicate, such as alkali polysiloxane, there is condensation between di-siloxonate and ortho-sialate molecules, reactive groups, Si—OH and aluminum hydroxyl OH—Al, with the creation of an ortho-sialate-disiloxo cyclic structure; therefore, the alkaline groups are liberated and react again. Further polycondensation forms the alkali-poly (sialate-disiloxo) structure typical of geopolymers.

The indicated sequence of chemical reactions, once initiated, proceeds at a rate that is surprisingly compatible with the performing of direct 3D printing and that can also give rise to a complex three-dimensional structure, provided that the composition parameters are respected that provide the formulation with specific rheological parameters that are necessary, on the one hand, for the feasibility of implementing the direct 3D printing and, on the other hand, for the creation of three-dimensional structures capable of maintaining the shape imparted upon extrusion until the completion of the geopolymerization reaction.

If necessary for specific applications, the formulations of the disclosure may contain, in addition to the basic components for the geopolymerization reaction indicated above, also retarding agents.

The retarding agent can be, for example, lignosulphonate, sodium lignosulphonate, a sugar such as sucrose or glucose, or other known retardants employed in cement formulations, which prevent the release of water and therefore slow down the geopolymerization reaction. Low concentrations (from 0.1% to 5% by weight of the total) are usually sufficient to provide a sufficiently long printing window. The retarding agent concentration is chosen according to the setting time of the geopolymeric suspension and the period of time required to print the desired object/three-dimensional structure.

If necessary for specific applications, the formulations of the disclosure may contain, in addition to the basic components for the geopolymerization reaction indicated above, also gelling agents.

The gelling agent can be, for example, poly-acrylate sodium salt or other substances capable of forming a reversible physical gel, in an alkaline environment, such as colloidal silica, layered silicate (laponite, hectorite, bentonite). Generally, the gelling agent concentration to be adopted in the formulations of the disclosure is comprised of between 0.1% and 20% by weight of the total depending upon the rheological properties to be imparted to the geopolymeric suspension.

The concentration of water in the geopolymeric suspension depends upon the concentration of the alkali silicate solution and on that of the basic solution; the concentration of water influences the rheological properties of the mixture in suspension and the final mechanical properties of the objects/structures obtained therefrom. In general, according to an aspect of the disclosure, the ratio of the molar content of water and that of sodium or potassium oxide should be less than 25, that is, the relationship $$H_2O/(Na_2O,K_2O)<25$$

must apply and preferably should remain below 17.5 in order not to limit the geopolymerization reaction and the mechanical properties of the geopolymeric objects/structures obtained.

By varying the extrusion speed and pressure during the direct 3D printing process, the same viscoelastic formulation according to the disclosure can be used with a variety of nozzle diameters. Typically, an ink formulation is extruded through a capillary nozzle under an applied pressure between about 20 Pa and about 1 kPa with a deposition rate ranging from about 1 mm/s up to about 50 mm/s. For example, the diameter of the nozzle tip can be between about 0.1 mm and about 5 mm. A larger nozzle tip diameter can be between about 10 mm and 200 mm or more for specific applications, for example in the construction sector.

Because of the viscoelastic nature of the formulations according to the disclosure, they demonstrate high viscosity (on the order of tens or hundreds of Pa·s) at a low "shear rate" or "velocity gradient" (referred to as "shear rate" in technical language).

Here and hereinafter, by "low" is meant a velocity gradient/shear rate, for example on the order of about $0.1\ s^{-1}$ (1/s) or less).

The formulations according to the disclosure also show a substantially reduced viscosity during extrusion through the nozzle, where the shear rate is much higher and relatively high (wherein, here and hereinafter, by "high" is meant a velocity gradient/shear rate, for example, on the order of $10\text{-}100\ s^{-1}$).

The geopolymeric formulations according to the disclosure have the rheological characteristic of possessing a level of viscosity that is reduced by at least an order of magnitude during extrusion, a phenomenon referred to as pseudoplastic behavior or "shear-thinning".

Here and hereinafter, by "order of magnitude" is meant a range of values of a magnitude that extends from a determined value up to ten times that value.

For example, the (apparent) viscosity of a formulation according to the disclosure during extrusion is typically about 0.1 Pa per second (Pa·s) or lower, while at a low shear rate (before and after extrusion) the viscosity of the same formulation is about 2,000 Pa·s, a difference of four orders of magnitude.

The extruded strands are oriented in such a way as to form a geopolymeric single-layer or multi-layer structure, consisting of interconnected strands. The strands typically have a width (or diameter) in a range from about 0.1 mm to about 5 mm, corresponding to the nozzle size used. The resulting structures can be solid or hollow or may have a reticular structure. The spacing (or pitch) between the extruded strands can vary from about 0.1 mm to about 10 mm or even much higher depending upon the rheology of the mixture and the thickness of the strand. In general, the lattices formed by strands obtained by extrusion of the ink formulations for direct 3D printing according to the disclosure include 1 to 20 (or more) levels or layers. The pattern may be periodic (i.e. repetitive) according to one, two or three dimensions.

Because of the different steps that comprise the geopolymerization reaction of the formulations of the disclosure, the extruded strands have a physical-chemical structure that changes over time, from a pre-geopolymerization structure (typically during extrusion) to a post-geopolymerization structure, each of which may have different elastic properties. The pre-geopolymerization structure of the strand during the extrusion/just extruded step includes a physical gel and a weak interaction between molecules containing silicon atoms with no three-dimensional chemical crosslinking. This physical structure presents itself as a gel having an elastic and viscous behavior that is suitable for extrusion through the nozzle. In contrast, the post-geopolymerization structure of the strand typically includes three-dimensional chemical crosslinking and confers the properties of a rigid solid to the structure.

As stated, typically, the geopolymerization occurs at ambient temperature; alternatively, the ink formulations for direct 3D printing according to the disclosure can be geopolymerized by means of heating at temperatures between about 50° C. and about 200° C. for several hours.

After geopolymerization, the structure may be treated, for example, if it is necessary to modify the pH therein or to improve the mechanical properties therein. For example, the geopolymerized structure may be heated to a temperature between about 300° C. and about 1,000° C. in air for several hours, for example to obtain, as will be seen, a ceramization of the geopolymeric structure with the formation of a crystalline phase.

Ink Formulations Based Upon Metakaolin Potassium and Fly Ashes (FA-K-MK-Systems)

One possible approach, provided here as a purely illustrative and non-limiting example, in order to create a K-MK-FA type viscoelastic ink is as follows.

A first step is the preparation of a KOH solution. Once the KOH is completely dissolved in distilled water, a solution of potassium silicate based activators is prepared in a blender. The solution is prepared at least 24 hours prior to its use in order to allow for the complete dissolution of the silicate within the basic solution. The addition of reactants occurs at room temperature under continuous agitation, in this order: water, retardant, gelling agent, metakaolin, fly ashes.

Example 1

A geopolymeric suspension was prepared with the following molar ratios between the oxides: $SIO_2/Al_2O_3=4$, $K_2O/SiO_2=0.25$ and $H_2O/K_2O=15.83$; sodium-lignosulfonate was used as a retardant with a concentration of about 0.6% by weight of the total and a sodium salt of polyacrylic acid was used as a gelling agent with a concentration of about 6% by weight of the total. A 15 M KOH solution was prepared by completely dissolving KOH in distilled water. A solution of potassium based activators (potassium hydroxide and sodium silicate) was prepared in a stirrer (Ika-Werke Ost base, Staufen, Germany) at 500 rpm for 5 min, according to the following weight ratio: 1.86:1 solution of silicate in 15 M of KOH solution. After 24 hours, the sodium-lignosulfonate and the sodium salt of the polyacrylic acid were added while stirring at 500 rpm for 45 minutes, respectively. The metakaolin was added at room temperature and stirred at 800 rpm for 30 minutes, this was followed by the addition of fly ashes and stirring at 1,000 rpm for another 30 min. With respect to the metakaolin an addition of 50% by weight of fly ashes was used.

Figure 2:
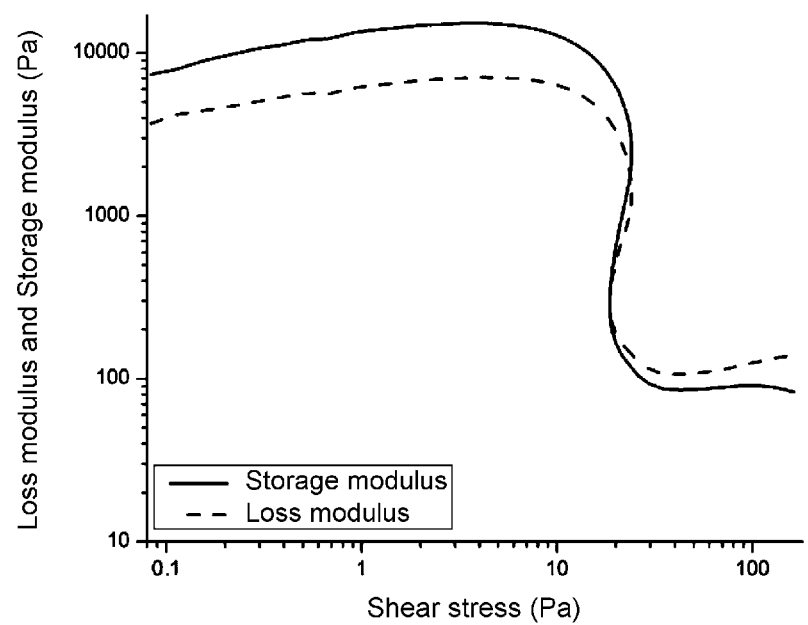

The final ink formulation exhibits, as shown by the graphs of FIGS. 1 and 2, a pronounced pseudoplastic or "shear thinning" behavior; the ink has high viscosity, on the order of $10^3$ Pa·s, at a low velocity gradient/shear rate or "shear" (0.1 1/s) whereas the viscosity decreases by four orders of magnitude when the shear rate or velocity gradient increases to 100 1/s.

This behavior facilitates the flow of the ink formulation through the fine deposition nozzles and at moderate pressures. For example, when the ink formulation described above was printed through a 0.84 mm aperture nozzle at an extrusion speed of 6 mm/s, which corresponds to an estimated shear rate of 30 1/s, the viscosity was approximately equal to about 7 Pa·s; the printing was made by extruding the geopolymeric formulation onto a support or substrate immersed in sunflower oil. Under these conditions, the viscosity of the ink formulation is more than two orders of magnitude less than that observed at a low shear rate (0.1 1/s).

As shown by the graphs of FIGS. 1 and 2, in addition, not only the direct 3D printing ink formulation according to the disclosure demonstrates that it undergoes the phenomenon of pseudoplasticity, but it also possess a limit or initial yield stress threshold $\tau_y$, typical of so-called Bingham fluids, which must be overcome such that the ink can deform and flow; $\tau_y$ was estimated at ~20 Pa at the intersection between the curves G' and G" (FIG. 2), which represent the "storage modulus" (G'), that describes the elastic properties of the formulation, and the "loss modulus", that describes the viscosity of the formulation.

From the above, it is evident that the formulations of the disclosure are geopolymeric fluid formulations, i.e. they are capable of undergoing the geopolymerization reaction and ultimately provide a solid geopolymer and, at the same time, have the rheological characteristics of a non-Newtonian, viscoelastic fluid and having pseudo-plastics properties.

The graph in FIG. 2 was obtained by means of a "strain sweep" or "oscillometric rheology" test that allows the moduli G' and G" to be measured.

According to Smay et al. and Schlordtil et al. [1,2] the conditions for stability of a static unsupported viscoelastic material can be determined. To have a minimum deflection (up to <0.05 times the diameter of the strand) the following equation must be verified:

$$G' \geq 0.35 \cdot \gamma \cdot (L/D)^4 \cdot D$$

where G is the "storage modulus of the viscoelastic suspension" or "slurry", γ is the specific weight of the geopolymer (GP) within the eventual printing medium, (e.g. for oil $\gamma=[\rho_{Gp}-\rho_{oil}]*g$ where "g" is the acceleration due to gravity ~9.81 m/s² and ρ is the density), L is the length of the unsupported strand span (the distance between two points of the support for the strand), and D is the diameter of the strand.

In the formulation of this embodiment a viscoelastic geopolymeric formulation strand is extruded which has a diameter of 0.84 mm and 2 mm of unsupported span ("spanning"). The geopolymeric formulation has a density $\rho=1.51$ g/cm³, which corresponds to a specific weight in sunflower oil of $5.79 \cdot 10^3$ N/m³. With these values, a value of $G' \geq 55$ Pa is obtained. The graph in FIG. 2 shows a plateau value for G' of ~15.2 kPa, considerably higher than the threshold required of 55 Pa.

Schlordtil et al. has also proposed a model that can be used to dynamically describe the deformation of a simply supported beam formed from a viscoelastic fluid, giving the following equation for the center line deflection:

$$z(t) = \frac{1}{2}\sqrt{L(t)^2 - L_0^2}$$

where z (t) is the center line deflection (time-dependent), $L_0$ is the initial length of unsupported strand span and L(t) is the time-dependent unsupported strand length, which can be expressed as:

$$L(t) = L_0 \cdot \left(1 + \int_0^t \frac{\rho g L_0}{6\eta(t)} dt\right)$$

where ρ is the density of the formulation or viscoelastic "mixture", g is the acceleration due to gravity and η(t) is the time-dependent viscosity (in recovery with reference to the initial viscosity).

Figure 3:
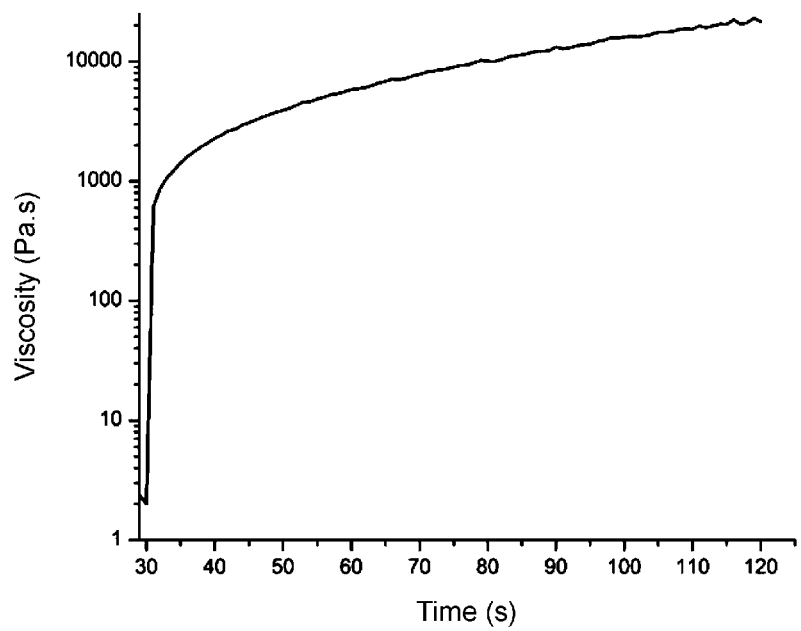

In the formulations and methods of the disclosure, the geopolymeric material during the reaction step is extruded at a high shear rate and a low viscosity; once deposited as a strand, the viscosity therein should increase rapidly (recovery) in order to minimize the deformation z(t). Taking into account that the strand is immersed in oil and then receives a boost against the force of gravity from Archimedes' law, it is verified that, by applying the above formula, the viscosity of the formulation according to the disclosure is low at first but increases by more than two orders of magnitude in the first ~5 seconds, thus, as can be seen in FIG. 3, reaching a plateau value. This result confirms that the suspension has a rheology that is appropriate for 3D printing, insofar as the increase in viscosity (signifying an increasing in the rigidity of the system) occurs within a very short period of time, reducing the deformation of printed structures even if they are not supported.

For a 2 mm long unsupported strand distance and a strand diameter of 0.84 mm, the final calculated deflection is about 0.25 mm, which confirms that the desired geometry can be printed with good precision.

According to an aspect of the disclosure, carrying out the direct 3D printing in oil rather than air not only an "indirect" support of the strand during the extrusion phase is obtained, but the oil also reacts with the KOH that is still present by means of a process of saponification, allowing components to be obtained that are porous and, therefore, lighter.

Figure 7:
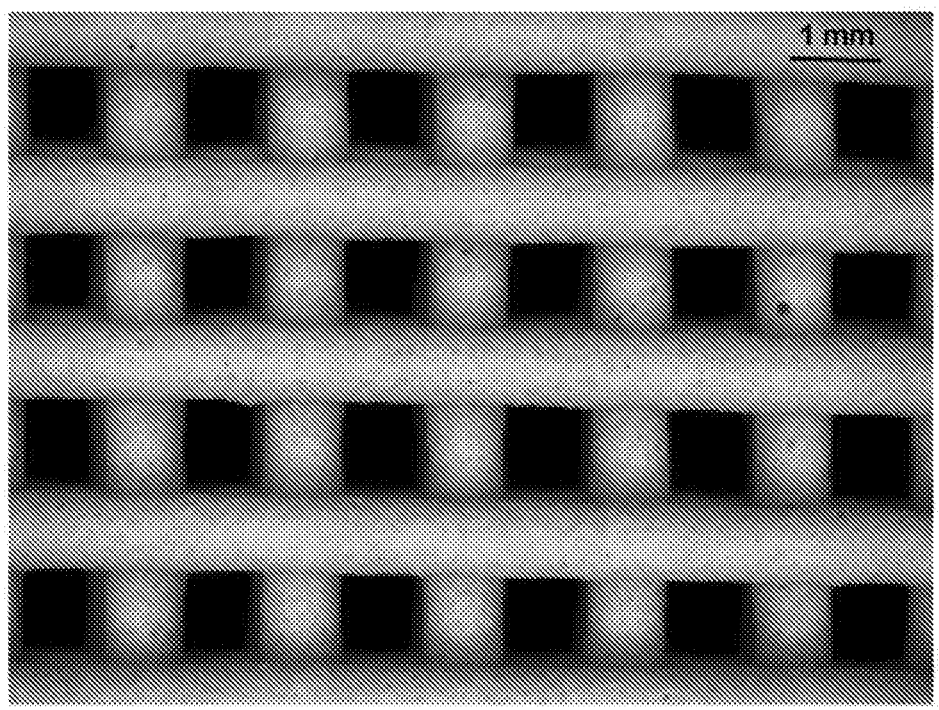
FIGS. 7 and 8 are micro-photographs of solid three-dimensional structures (in the Na-MK system and in the K-MK-FA system) manufactured according to the disclosure.
Figure 8:
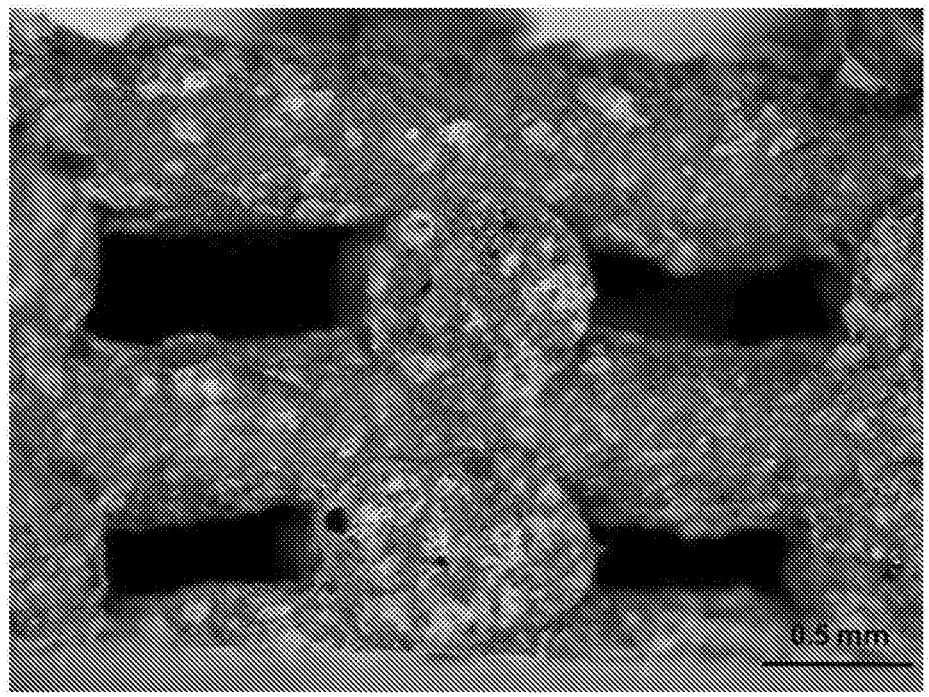

Using this process, a three-dimensional structure is manufactured that is defined by a lattice composed of cylindrical strands of 0.84 mm diameter with a spacing between them (pitch) of 1.16 mm and formed in six superimposed layers, as is visible in the micrographs of FIGS. 7 and 8.

The lattices were modeled in a tetragonal structure, with a distance between the strands equal to approximately the diameter of the strand, resulting in minimal deformation.

Figure 9:
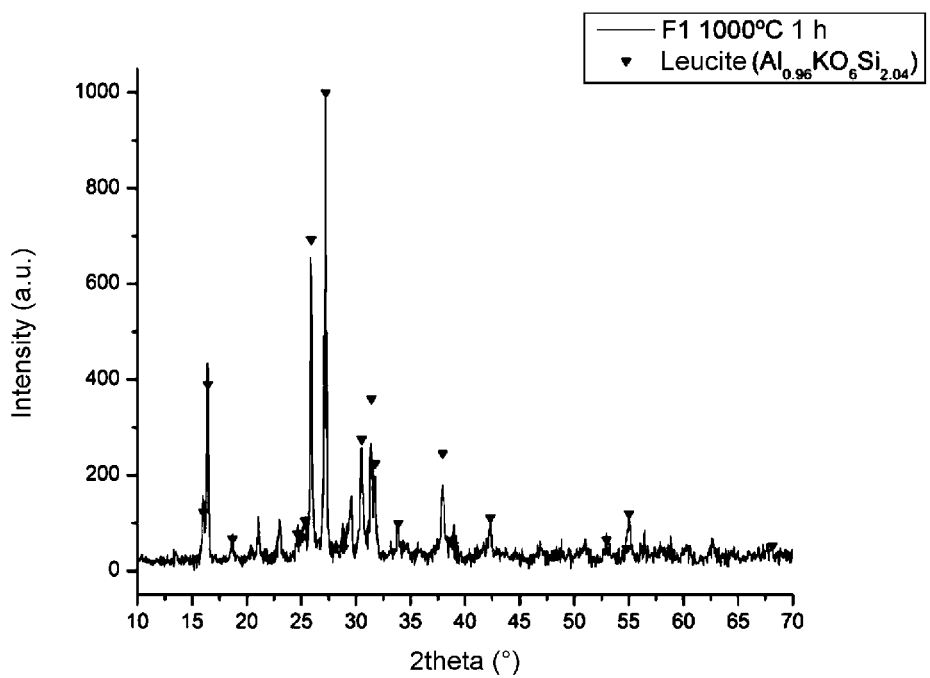
FIGS. 9 and 10 illustrate the diffraction spectra of the formulations of FIGS. 1-6 (in the K-MK-FA system, and in the Na-MK system) when subjected to high-temperature heat treatment (1000° C. for 1 hour).

The lattices have a total porosity of 69.9±2.0%. Treating the geopolymeric reticular structure obtained at 1,000° C. for 1 h, the XRD examination (FIG. 9) shows crystallization of the structure with the formation of the leucite phase.

Sodium Meta Kaolin and Fly Ashes (Na-MK-FA) Based Ink Formulations

A second possible approach, given herein as a purely illustrative and non-limiting example, in order to create a viscoelastic ink of the Na-MK-FA type, is as follows.

A first step is the preparation of a NaOH solution. Once the NaOH is completely dissolved in distilled water an activation solution of sodium hydroxide and pyrogenic silica is prepared in a blender. The activation solution is prepared at least 24 hours before use in order to allow the silica to dissolve completely within the basic solution. The addition of the reactants takes place at ambient temperature under continuous agitation, in this order: water, a gelling agent, metakaolin, fly ashes.

Example 2

A geopolymeric suspension is prepared with the following molar ratios between the oxides: $SiO_2/Al_2O_3=3.8$, $Na_2O/SiO_2=0.263$ e $H_2O/Na_2O=13.78$; sodium salt of polyacrylic acid is used as a gelling agent with a concentration of about 7% by weight of the total.

In this example, a retarding agent is not necessary, because the geopolymerization reaction occurs more slowly.

A 15M NaOH solution was prepared by completely dissolving NaOH in distilled water. A solution of activators (sodium hydroxide and pyrogenic silica) was prepared in a stirrer (Ika-Werke Ost base, Staufen, Germany) at 500 rpm, for 5 min, according to the following weight ratio: 0.28:1 pyrogenic silica compared to NaOH 15M. After 24 hours the sodium salt of polyacrylic acid was added under stirring at 1,000 rpm for 20 min. The metakaolin was added at room temperature and stirred at 1,000 rpm for 15 min.

Figure 4:
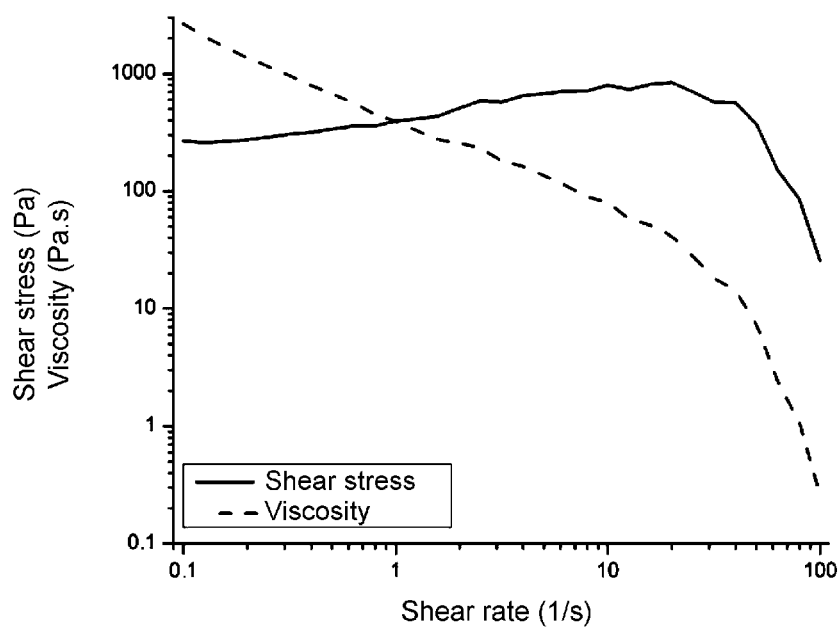
FIGS. 4, 5 and 6 are graphs illustrating the rheological behavior of a second geopolymeric formulation (in a Na-MK system) according to the disclosure.

The final ink formulation for direct 3D printing demonstrates (FIGS. 4 and 5) behavior that is very similar to that observed for the formulation of Example 1 based on K-MK-FA; the viscosity at a low shear rate (0.1 l/s) is of the same order of magnitude ($10^3$ Pa·s) as the previous formulation and is subject to the same decrease by about four orders of magnitude at a higher shear rate (100 l/s).

When the ink formulation was printed through the same nozzle of 0.84 mm in diameter at the same speed (6 mm/s), its viscosity was approximately equal to 18 Pa·s, slightly higher than the formulation of Example 1 but still within the working range of the 3D printer.

Figure 5:
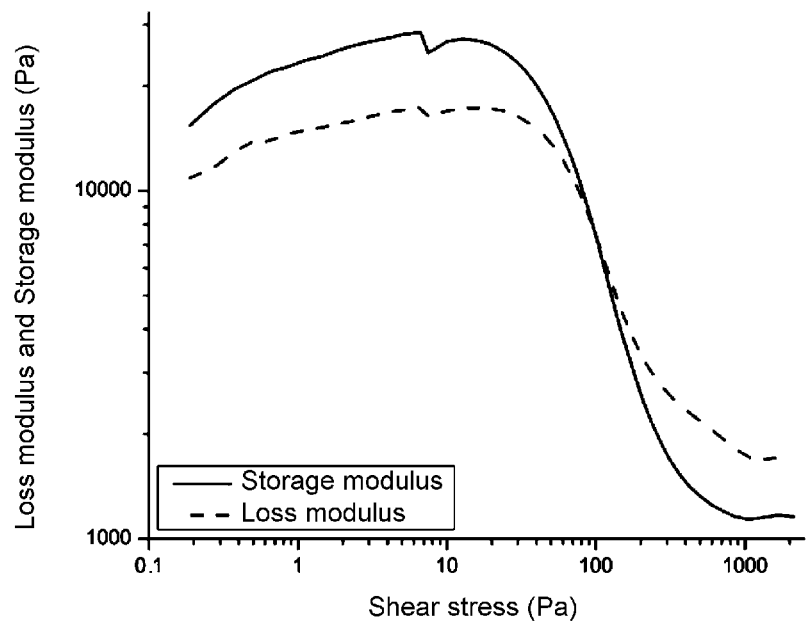

Even in this case, the Na-MK-FA formulation according to the disclosure also possesses a starting flow-threshold limit or "yield stress" $\tau_y$, typical of so-called Bingham fluids, which must be exceeded such that the ink may deform and flow; $\tau_y$ was estimated at ~100 Pa at the intersection between the curves G' and G" (FIG. 5).

The geopolymeric formulation in form of a paste or "slurry" form had a density $\rho=1.36$ g/cm$^3$, which corresponds to a specific weight in sunflower oil of $4.32 \cdot 10^3$ N/m$^3$. With these values, a value of G'≥41 Pa is obtained from the equation which describes the theoretical model illustrated in Example 1. The graph (FIG. 5) shows a G' plateau value of ~28.5 kPa, considerably higher than the required threshold.

Figure 6:
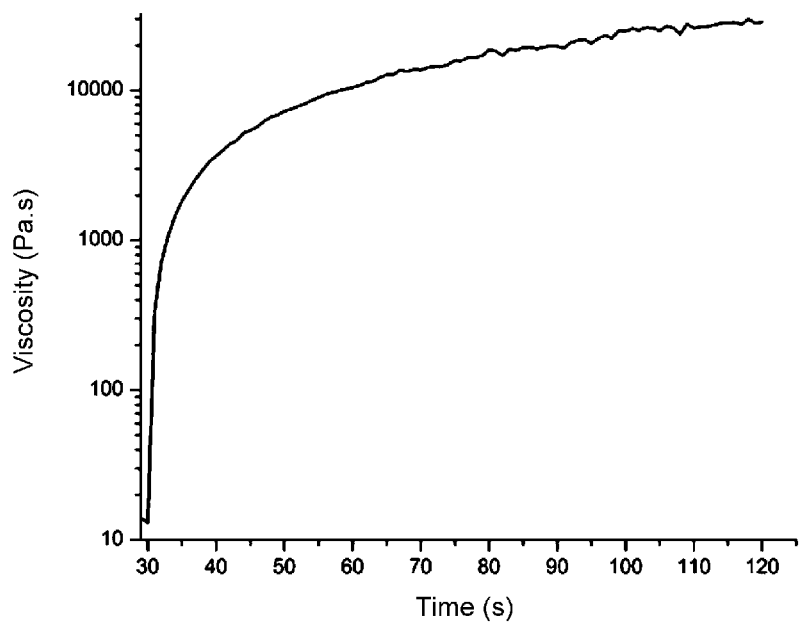

The time dependent viscosity recovery test shows a low initial viscosity which increases by two orders of magnitude in the first ~5 s, as seen in FIG. 6, reaching a plateau value. This result confirms that the suspension exhibits appropriate rheology for direct 3D printing.

For an unsupported strand distance of 2 mm and a strand diameter of 0.84 mm, the final calculated deflection is ~0.19 mm, which confirms that the desired geometry can be accurately printed using this ink formulation.

The printing of the geopolymer strand lattice was performed, as in example 1, in a bath of sunflower oil, with the same advantages discussed in example 1.

The lattices have a total porosity of 69.8±2.0%.

Figure 10:
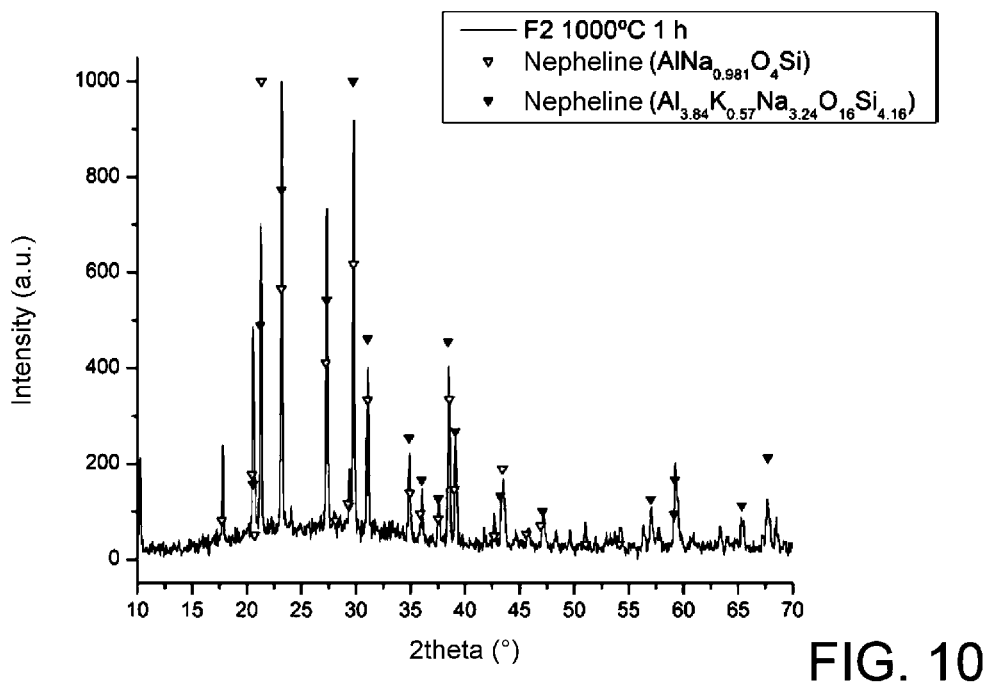

If thermally treated at 1,000° C. for 1 h, the geopolymer crystallizes as shows from the XRD analysis (FIG. 10) highlighting the formation of nepheline phases.

Development and Characterization of the Measurement Methods

The rheological tests on the preparations from samples 1 and 2 were performed using a stress controlled rheometer (MCR302, Anton Paar GmbH, Austria), with a geometry of 50 mm diameter flat parallel plates. A Peltier cell cooling system was used to control the temperature. The following types of test were performed: 1) flow curve, with a shear rate ramping from 0.1 l/s to 100 l/s; 2) Strain sweep test, with an oscillation growing logarithmically from 0.001% to 100% at a frequency of 1 Hz; 3) constant stress recovery test under recovery stress for 90 s.

Direct Geopolymeric Structure 3D Printing

For the direct 3D printing, a commercial fusion deposition modeling printer for polymeric materials was used (Powerwasp Evo, Wasp, Italy) that was modified in order to be equipped with a syringe extruder. Conical nozzles of various sizes (Nordson Italy Spa, Italy) mounted on the syringe were used. A nozzle having a diameter of 0.84 mm was used in the two examples described, printing in a non-wetting oil bath (sunflower oil). The geopolymeric ink formulation flow was initiated, and the lattices were printed at a speed of 1.8-2.4 mm/s. The printed lattices were defined by the strand width, strand spacing, total modeled surface, number of layers, and by their geometry. Lattices of dimensions 24×24×5.6 mm$^3$ were printed wherein the length of the extension between the centers of two adjacent strands was 2 mm, and the diameter of the strands was 1 mm.

Morphological Analysis

The morphology of the strands and of the lattices was studied using an optical stereoscope (Wild Heerbrugg, Type 376,788) coupled to a digital camera and scanning electron microscope (FEI Quanta200 ESEM, Eindhoven, Netherlands). The density of the geopolymeric inks was calculated using the mixtures rule. The actual density of the geopolymer after reaction was measured using a helium pycnometer (Micromeritics AccuPyc 1330, Norcross, Ga.). The total porosity of the lattices was calculated as the ratio between the bulk density and the real density.

Composition

The composition of the geopolymers after heat treatment at 1,000° C. was analyzed using x-ray powder diffractometry (D8 Advance, Bruker, Germany).

CONCLUSIONS

The experimental tests referred to in the examples outlined above lead to the conclusion that it is perfectly practicable to manufacture geopolymeric formulations that are capable, in the fluid state, of constituting and behaving like direct 3D printing inks, therefore with suitable viscoelastic and rheological characteristics and capable, at the same time, of generating by geopolymerization within a very short time, solid geopolymers that are both amorphous and crystalline (if heat treated at high temperature) such that the three-dimensional structure that is formed step by step with 3D printing by the extrusion of strands is self-supporting, i.e. capable of maintaining the shape imparted at the moment of the extrusion, even without direct support from the substrate or from a lower layer.

The formulations of the disclosure may also possess, in solid geopolymerized form, special mechanical and/or insulation characteristics, e.g. with the addition of suitable fillers or additives such as rubber, organic resins, alumina, silicates, glass, minerals, short polymeric or inorganic fibers.

These lend themselves, in the automotive industry field, to the manufacturing of the insulating layer or "underlayer" (or part thereof) present within the brake pad between the metal support or "backplate" and the block of friction material the brake pad is composed of, especially for brake pads intended for heavy duty use and therefore subject to extreme heating during use, due to the fact that the geopolymers are thermally stable at temperatures to which the brake pads may be subjected during use.

The formulations of the disclosure also lend themselves to direct 3D printing on the metal support or other parts of vehicle brake pads, such as connectors and layers or electrically insulating point coatings designed to cover parts of electrical circuits, possibly screen printed, or electrical contacts.

More generally, the geopolymeric formulations of the disclosure are suitable for manufacturing artifacts of any kind, even of large dimensions for building construction, provided that 3D printers specially manufactured with large dimensions are used and, above all, for manufacturing filtering elements or catalyzer supports, wherein 3D structures with high porosity are manufactured, obtainable only with the appropriate choice of alkaline base and of the amount of water used in the formulation.

The invention claimed is:

1. A geopolymeric formulation including ingredients comprising metakaolin as a source of polysilicates, a soluble alkaline polysilicate, and an aqueous alkaline solution in proportions such that the formulation in a fluid state has, at a relatively low shear rate equal to or less than 0.1 1/s, a viscosity of four orders of magnitude greater than a viscosity that the same formulation in the fluid state has at a relatively high shear rate equal to or greater than 100 1/s; wherein the ingredients are present in such proportions as to undergo a geopolymerization reaction and produce, at an end of the geopolymerization reaction, a solid geopolymer; and wherein, before and during at least a part of the geopolymerization reaction in which three-dimensional chemical bonds are not yet formed, the formulation reversibly forms a non-Newtonian, viscoelastic gel from a fluid.

2. The formulation according to claim 1, wherein, when in a fluid state, the formulation has a starting flow-threshold limit or yield stress that is greater than or equal to 20 Pa.

3. The formulation according to claim 1, wherein when in a fluid state, the formulation has a starting flow-threshold limit or yield stress that is greater than 20 Pa, a viscosity measured at a shear rate of 0.1 1/s of about 103 Pa·s, and a viscosity measured at a shear rate of 30 1/s of between about 5 to 20 Pa·s.

4. The formulation according to claim 1, wherein the formulation has an atomic ratio Si:Al of between 1:1 and 35:1 inclusive, a $(Na_2O, K_2O)/SiO_2$ molar ratio of between 0.20 and 0.28 inclusive, a $SiO_2/Al_2O_3$ molar ratio of between 3.5 and 4.5 inclusive, a $H_2O/(Na_2O, K_2O)$ molar ratio of between 10 and 25 inclusive, and a $(Na_2O, K_2O)/Al_2O_3$ molar ratio of between 0.80 and 1.20 inclusive.

5. The formulation according to claim 1 wherein the formulation includes at least one filler selected from a group consisting of rubber, organic resins, alumina, silicates, glass, mineral fillers, polymeric and inorganic short fibers.

6. A direct 3D printing ink composition comprising a geopolymeric formulation in a fluid state according to claim 1.

7. The direct 3D printing ink composition according to claim 6, wherein the formulation further includes at least one geopolymerization reaction retarding agent, the retarding agent being present within the formulation in an amount between 0.1 and 5% by weight on the total weight.

8. The direct 3D printing ink composition according to claim 6, wherein the formulation further includes at least one fluidifying agent, the fluidifying agent being present within the formulation in an amount between 0.1 and 5% by weight on the total weight.

9. The direct 3D printing ink composition according to claim 6, wherein the formulation further includes at least one gelling agent, the gelling agent being present within the formulation in an amount between 0.1 and 20% by weight on the total weight.

10. A direct 3D printing ink composition comprising a geopolymeric formulation in a fluid state comprising
at least one inorganic compound comprising silicon and aluminum, the at least one inorganic compound selected from a group consisting of: a silicon-aluminate compound, a compound containing polysilicates, polysiloxane, polysilicon-aluminates and polysialates; and
at least one alkaline activator and water;
wherein the ingredients are present in such proportions as to undergo a geopolymerization reaction and produce, at an end of the geopolymerization reaction, a solid geopolymer;
wherein, before and during at least a part of the geopolymerization reaction in which three-dimensional chemical bonds are not yet formed, the formulation reversibly forms a non-Newtonian, viscoelastic gel from a fluid; and
wherein the formulation further comprises at least one geopolymerization reaction retarding agent, the retarding agent being present within the formulation in an amount between 0.1 and 5% by weight on the total weight.

11. A direct 3D printing ink composition comprising a geopolymeric formulation in a fluid state comprising
at least one inorganic compound comprising silicon and aluminum, the at least one inorganic compound selected from a group consisting of: a silicon-aluminate compound, a compound containing polysilicates, polysiloxane, polysilicon-aluminates and polysialates; and
at least one alkaline activator and water;
wherein the ingredients are present in such proportions as to undergo a geopolymerization reaction and produce, at an end of the geopolymerization reaction, a solid geopolymer;
wherein, before and during at least a part of the geopolymerization reaction in which three-dimensional chemical bonds are not yet formed, the formulation reversibly forms a non-Newtonian, viscoelastic gel from a fluid; and wherein the formulation further comprises at least one fluidifying agent, the fluidifying agent being present within the formulation in an amount between 0.1 and 5% by weight on the total weight.

12. A direct 3D printing ink composition comprising a geopolymeric formulation in a fluid state comprising at least one inorganic compound comprising silicon and aluminum, the at least one inorganic compound selected from a group consisting of: a silicon-aluminate compound, a compound containing polysilicates, polysiloxane, polysilicon-aluminates and polysialates; and at least one alkaline activator and water;

wherein the ingredients are present in such proportions as to undergo a geopolymerization reaction and produce, at an end of the geopolymerization reaction, a solid geopolymer;

wherein, before and during at least a part of the geopolymerization reaction in which three-dimensional chemical bonds are not yet formed, the formulation reversibly forms a non-Newtonian, viscoelastic gel from a fluid; and wherein the formulation further comprises at least one gelling agent, the gelling agent being present within the formulation in an amount between 0.1 and 20% by weight on the total weight.

* * * * *